Dec. 13, 1949        R. F. BEIDLE        2,491,152
HOSE FORMING MACHINE
Filed Oct. 3, 1947                            2 Sheets-Sheet 1
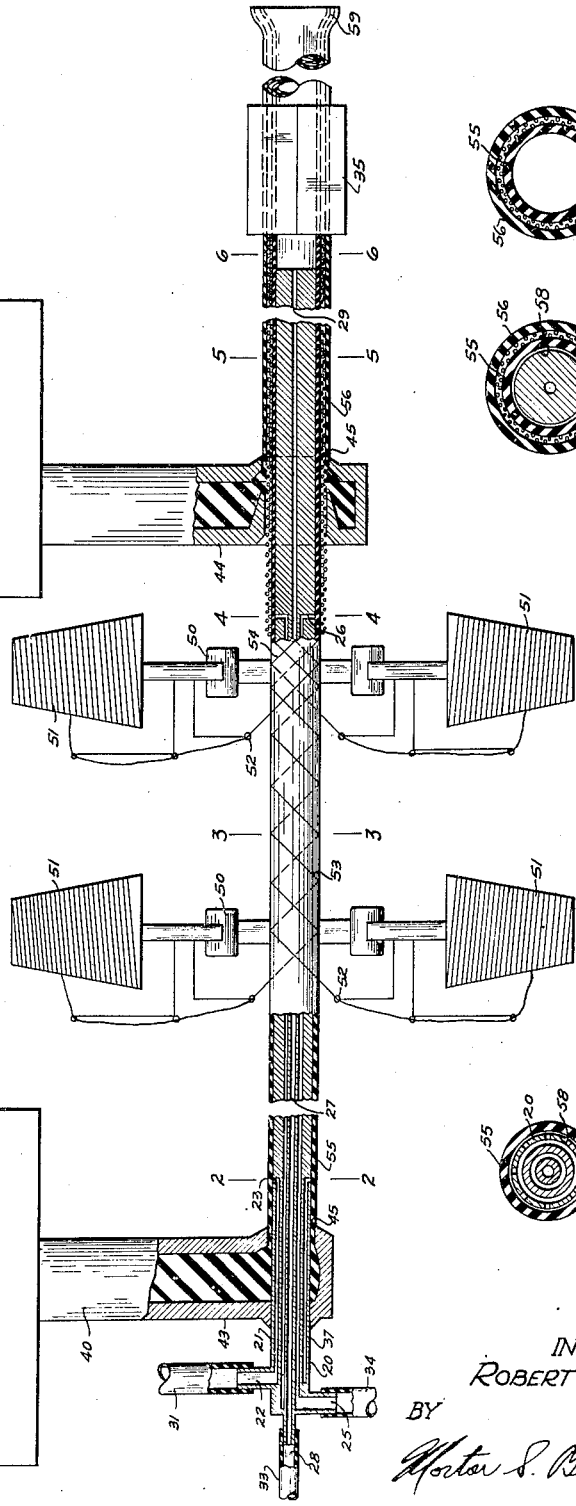
INVENTOR
ROBERT F. BEIDLE
BY
Morton S. Brockman Dec. 13, 1949  R. F. BEIDLE  2,491,152
HOSE FORMING MACHINE
Filed Oct. 3, 1947  2 Sheets-Sheet 2
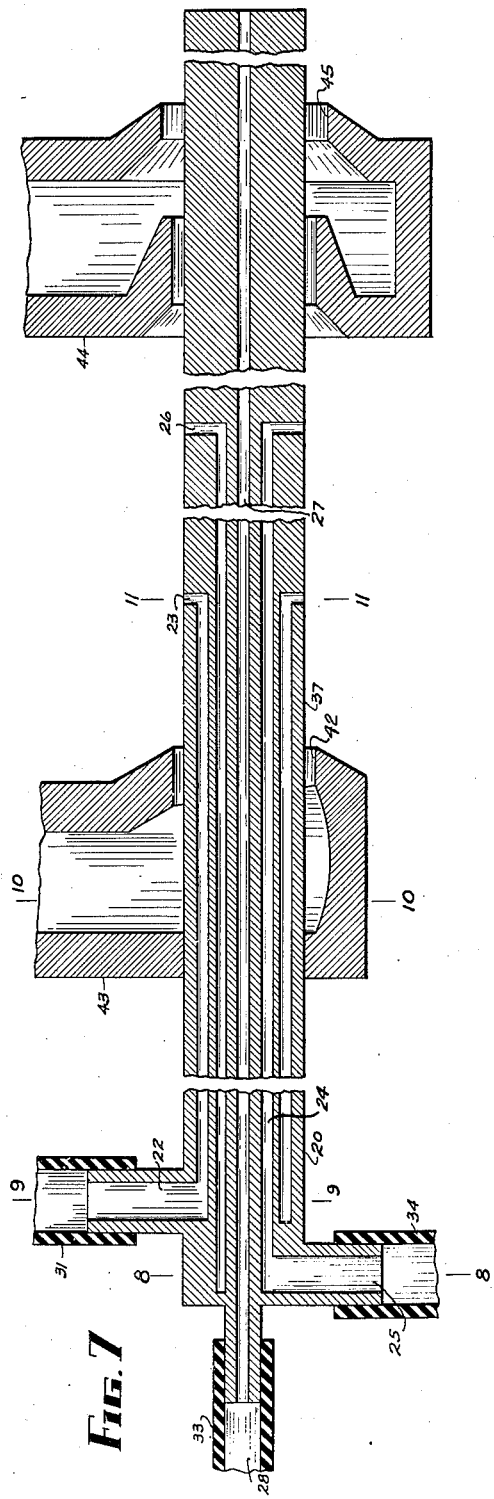
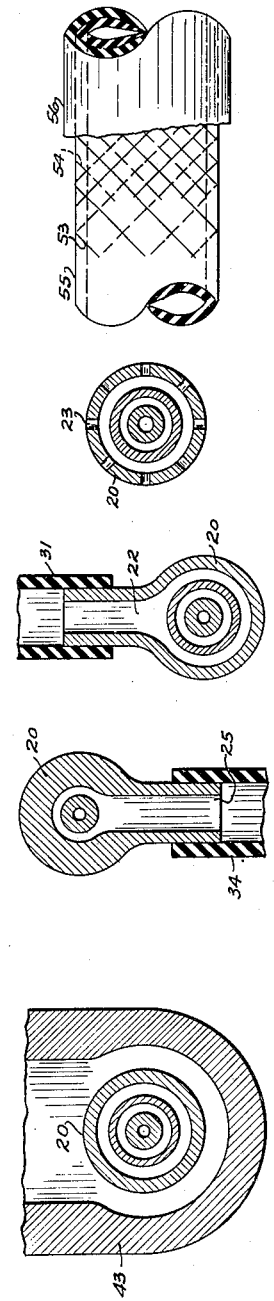
INVENTOR
ROBERT F. BEIDLE
BY
Horton S. Brockman Patented Dec. 13, 1949

2,491,152

UNITED STATES PATENT OFFICE 2,491,152

HOSE FORMING MACHINE

Robert F. Beidle, Cleveland, Ohio, assignor of one-third to Ben Kravitz, Cleveland, Ohio, and one-third to Oscar C. Kravitz, Cleveland, Ohio Application October 3, 1947, Serial No. 777,630

10 Claims. (Cl. 154—5)

1

This invention relates to rubber hose forming machines and particularly to machines which successively apply two or more layers of rubber and intermediate plies or windings of fabric or cord.

The primary object of this invention is to provide a machine which will produce unlimited lengths of rubber hose of the type stated in a continuous manner.

Another object is to provide a hose forming machine which is economical to manufacture and use and which is practically automatic in its operation.

These and other objects of the invention will become apparent from a reading of the following specification and claims, together with the accompanying drawings in which the same parts are referred to and indicated by the same reference characters and wherein:

Figure 1 is a view of the hose forming machine, partly schematic, made in accordance with this invention;

Figure 2 is an enlarged vertical cross sectional view of the machine and a part of the hose being formed thereon, taken substantially along the line 2—2 of the Figure 1;

Figure 3 is a similar cross sectional view of the machine and hose taken along the line 3—3 of the Figure 1;

Figure 4 is another similar view of the machine and hose taken substantially along the line 4—4 of the Figure 1;

Figure 5 is another similar view of the machine and hose taken substantially along the line 5—5 of the Figure 1;

Figure 6 is another similar view of the machine and hose taken substantially along the line 6—6 of the Figure 1;

Figure 7 is an enlarged cross sectional view of a portion of the machine alone;

Figure 8 is a cross sectional view of the machine taken substantially along the line 8—8 of the Figure 7;

Figure 9 is another cross sectional view of the machine taken substantially along the line 9—9 of the Figure 7;

Figure 10 is another cross sectional view of the machine taken substantially along the line 10—10 of the Figure 7;

Figure 11 is another cross sectional view of the machine taken substantially along the line 11—11 of the Figure 7; and Figure 12 is a side view of a piece of finished hose with portions thereof broken away to show the different layers of plies and material thereof.

2

This invention consists broadly of a mandrel, nozzles, a cord winding or plying device, and a rubber curing means. Each of these elements will be described in detail and in the order stated.

The mandrel 20, as shown in the accompanying drawings, is a bar-shaped metal member having a peripheral surface 37 corresponding to the shape of the inner surface of the hose to be formed. This mandrel 20, as shown, has three channels extending longitudinally therethrough. The first channel 21 has a port 22 and to which there is attached a conduit 31 which leads to a source of lubricating fluid. The channel 21 has a vent 23 which opens into the periphery of the mandrel. The second channel 24 has a port 25 connected to the conduit 34 which leads to another source of lubricating fluid. The channel 24 has a vent 26 slightly forward of the port 23. Similarly, the third channel 27 has a port 28 connected to a third lubricating fluid conduit 33 and a forward vent 29. The vent 29, unlike the vents 23 and 26, opens at the end of the mandrel instead of in the periphery thereof.

The preferred lubricating fluid is compressed air; however, liquid fluids or dusting powders might also be used and applied through the channels. The purpose of the lubricating fluid is to prevent the newly formed layer of tubular hose material from adhering to the mandrel and to cause it to slide easily therealong, so that it may be automatically operated on and treated at various stages. Heretofore it has been the practice to apply oil or powder on the surface of the mandrel to prevent the hose from adhering thereto, but it has just been found that by blowing air into the space 58 between the mandrel and the newly formed first layer of hose, the air will inflate the unfinished hose sufficiently to allow it to move steadily and smoothly along the mandrel.

Where the first layer 55 of unfinished hose material is unprotected or uncovered, a flow of air under relatively low pressure is desirable. A pressure of about ten pounds is sufficient at that point. After the cords 53 and 54 have been wound around the first layer 55, a flow of air under a higher pressure may be used. At this point, air at about fifty pounds pressure is sufficient. Where, as illustrated, the first layer 55 and the cords 53 and 54 are covered further with a second layer of hose material 56, a still higher pressure may be used. A pressure of about seventy-five pounds at this point not only helps to cleanly separate the newly formed hose from the mandrel, but also expands the hose in the curing machine 35 so that it is more uniformly and more effectively cured. The finished end 59 of the hose is crimped or is otherwise sealed to prevent air escaping therefrom, and during the entire manufacturing process the hose is inflated with air entering the ports 22, 25 and 28. A suitable balance of air pressures may be easily maintained by regulating the flow and pressure of air through the three channels 21, 24 and 27. This can be done by means well known in the art and specific illustration of such means is therefore not shown. The compressed air or other lubricant sources are not shown in the drawings, since they also are well known to persons skilled in the art. Conventional mechanical air compressors or tanks containing air under pressure provide simple and suitable air lubricant means.

The nozzle members 40 are connected to tanks or vats 41 of bulk plastic rubber. These nozzles fit around the peripheral surface 37 of the mandrel, as shown. The rear portion 43 of the first nozzle is closed and is attached to the mandrel 20. Its orifice 42 is spaced from and surrounds the mandrel and forms, when the plastic rubber is forced therethrough, a first layer 55 of raw or uncured rubber around the mandrel. This layer 55 is forced longitudinally along the mandrel and over the first vent 23. The partially formed tube then passes through the hereinafter described plying device and over the second vent 26 and into the second nozzle 40. The second nozzle has an open rear wall 44 to receive the first layer of rubber 55 and the windings 53 and 54 thereon, as shown. This second nozzle is similarly spaced from the mandrel and particularly from the second ply of cord 54, a distance corresponding to the thickness of the rubber layer 56 desired. Its orifice 45 is shaped to conform with the shape of the hose to be formed. That is, it may be grooved to form longitudinal ridges on the hose, or it may be round and smooth as shown.

The plying device is broadly indicated by the reference character 50 and consists of a suitable frame which revolves around the mandrel 20. It has spools of cord 51 which are applied in a helical fashion around the first layer of rubber 55. The first winding mechanism 52, which is only schematically shown, applies the cord 53 in a clockwise direction and the second winding mechanism 52 applies the second cord 54 in a counter-clockwise direction and on top of the cord winding 53. The two plies of cord 53 and 54 reinforce each other and are neatly embedded between the first and second layers of rubber 55 and 56.

The hose is then made to move along the mandrel into a curing machine 35 of a type more particularly described in my co-pending application, Serial No. 777,629, and which was filed concurrently with this application.

Having thus disclosed the invention in its preferred form, it should be understood that the specific embodiment thereof as described and illustrated herein is not to be considered in a limited sense, as there may be other forms or modifications of the invention which should also be construed to come within the scope of the appended claims.

I claim:

1. A hose former, comprising in combination, a rigid mandrel having a channel therethrough and opening into the periphery thereof, a nozzle member surrounding the mandrel and connected to a supply of bulk hose material, the said nozzle being capable of continuously ejecting and forming a tube of hose material around the mandrel proximate to the said channel opening, and a supply of lubricating fluid connected to the channel and conducted therethrough to a space formed between the mandrel and the tube.

2. A hose former, comprising in combination, a rigid mandrel having a plurality of channels and spaced vents therethrough opening into the periphery thereof, a nozzle member surrounding the mandrel and connected to a supply of bulk hose material, the said nozzle being capable of continuously ejecting and forming a tube of hose material around the mandrel proximate to the spaced vents, and a supply of lubricating fluid connected to the channel and conducted therethrough to a space formed between the mandrel and the tube.

3. A hose former, comprising in combination, a rigid mandrel having a plurality of air channels and spaced vents therethrough opening into the periphery thereof, a nozzle member surrounding the mandrel and connected to a supply of bulk hose material, the said nozzle being capable of continuously ejecting and forming a tube of hose material around the mandrel proximate to the spaced vents, and a supply of air connected to the channel and conducted therethrough to a space formed between the mandrel and the tube.

4. A hose former, comprising in combination, a rigid mandrel having a plurality of air channels and spaced vents therethrough opening into the periphery thereof, a nozzle member surrounding the mandrel and connected to a supply of bulk hose material, the said nozzle being capable of continuously ejecting and forming a tube of hose material around the mandrel proximate to the spaced vents, and a supply of compressed air connected to the channel and conducted therethrough to a space formed between the mandrel and the tube, the pressure of the air in each of the channels being at different pressures.

5. A hose former, comprising in combination, a rigid mandrel having a channel therethrough and opening into the periphery thereof, a plurality of nozzle members each surrounding the mandrel and connected to a supply of bulk hose material, each of the said nozzles being capable of continuously ejecting and forming a tube of hose material around the mandrel, and a supply of lubricating fluid connected to the channel and conducted therethrough to a space formed between the mandrel and the tube.

6. A hose former, comprising in combination, a rigid mandrel having a channel therethrough and opening into the periphery thereof, two spaced nozzle members each surrounding the mandrel and connected to a supply of bulk hose material, each of the said nozzle members being capable of continuously ejecting and forming a tube of hose material around the mandrel, a cord plying device between the two nozzle members and capable of applying a layer of cord on the first tube formed by one of the nozzle members, and a supply of lubricating fluid connected to the channel and conducted therethrough to a space formed between the mandrel and the first tube.

7. A hose former, comprising in combination, a rigid mandrel having a plurality of air channels and spaced vents therethrough opening into the periphery thereof, two spaced nozzle members each surrounding the mandrel and connected to a supply of bulk hose material, each of the said nozzle members being capable of continuously ejecting and forming a tube of hose material around the mandrel, a cord plying device between the two nozzle members and capable of applying a layer of cord on the first tube formed by one of the nozzle members, and a supply of air connected to the channel and conducted therethrough to a space formed between the mandrel and the tube.

8. A hose former, comprising in combination, a rigid mandrel having a channel therethrough and opening into the periphery thereof, a nozzle member surrounding the mandrel and connected to a supply of bulk hose material, the said nozzle member being capable of continuously ejecting and forming a tube of hose material around the mandrel proximate to the said channel opening, a cord plying device proximate to the nozzle member capable of applying a layer of cord on the tube formed by the nozzle member, and a supply of lubricating fluid connected to the channel and conducted therethrough to a space formed between the mandrel and the tube.

9. A hose former, comprising in combination, a rigid mandrel having a channel therethrough and opening into the periphery thereof, a nozzle member surrounding the mandrel and connected to a supply of bulk hose material, the said nozzle member being capable of continuously ejecting and forming a tube of hose material around the mandrel proximate to the said channel opening, a cord plying device proximate to the nozzle member capable of applying a layer of cord on the tube formed by the nozzle member, and a supply of compressed air connected to the channel and conducted therethrough to a space formed between the mandrel and the tube, the pressure of the air in the said channel being sufficient to expand the tube away from the mandrel.

10. A hose former of the type defined in claim Number 9 and further characterized by having connected thereto a curing means for treating the hose formed on the mandrel.

ROBERT F. BEIDLE.

REFERENCES CITED

The following references are of record in the file of this patent:

UNITED STATES PATENTS

| Number | Name | Date |
| --- | --- | --- |
| 127,755 | Forsyth | June 11, 1872 |
| 459,536 | Simon | Sept. 15, 1891 |
| 1,455,946 | Wester | May 22, 1923 |
| 1,913,327 | Barnes | June 6, 1933 |
| 2,119,465 | Meyer | May 31, 1938 |
| 2,171,764 | Ramsdell | Sept. 5, 1939 |
| 2,343,747 | Chernack | Mar. 7, 1944 |
| 2,361,026 | Greene | Oct. 24, 1944 |